(12) United States Patent
Lee (10) Patent No.: US 11,389,728 B2
(45) Date of Patent: Jul. 19, 2022

(54) METHOD AND SYSTEM FOR MONITORING MOBILE GAME MACRO USER

(71) Applicant: NHN CORPORATION, Gyeonggi-do (KR)

(72) Inventor: Chang Yul Lee, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/176,081

(22) Filed: Feb. 15, 2021

(65) Prior Publication Data

US 2021/0252409 A1 Aug. 19, 2021

(30) Foreign Application Priority Data

Feb. 14, 2020 (KR) .................. 10-2020-0018625

(51) Int. Cl.
*A63F 13/75* (2014.01)
*A63F 13/35* (2014.01)

(52) U.S. Cl.
CPC .............. *A63F 13/75* (2014.09); *A63F 13/35* (2014.09)

(58) Field of Classification Search
CPC .......... A63F 13/75; A63F 13/35; A63F 13/73; A63F 13/92; A63F 13/79; A63F 2300/535; A63F 2300/5586
USPC ........................................................ 463/29
See application file for complete search history.

(56) References Cited

U.S. PATENT DOCUMENTS

| 2009/0187992 A1* | 7/2009 | Poston | ............... G06F 21/563 726/24 |
| 2010/0087255 A1* | 4/2010 | Kniberg | .............. G07F 17/3239 463/42 |

FOREIGN PATENT DOCUMENTS

KR 10-2007-0039415 4/2007

OTHER PUBLICATIONS

Game Jacker, "How to create Your own Bot (Macro) for Mobile Games (Android / iOS) Tutorial", https://www.youtube.com/watch?v=aLO4aAFR5Yo&t=231s, Feb. 4, 2017. (Year: 2017).*

* cited by examiner

*Primary Examiner* — Michael A Cuff
(74) *Attorney, Agent, or Firm* — Ladas & Parry, LLP (57) ABSTRACT

Provided is a method of monitoring mobile game macro user. The method is performed by a processor of a computer. The method comprises executing an emulator module on an operating system module of the computer; generating a virtual terminal of a mobile operating system in the executed emulator module; executing a mobile game on the mobile operating system through the generated virtual terminal; executing a monitoring module, configured to monitor use of a mobile game macro for the mobile game executed in the virtual terminal through the emulator module, on the operating system module of the computer; checking, by the executed monitoring module, an identification portion displayed on a display screen of the mobile game; detecting, by the executed monitoring module, the use of the mobile game macro for the mobile game; and when the use of the mobile game macro is detected, transmitting the identification portion or identification information identified by the identification portion to a mobile game service server.

20 Claims, 8 Drawing Sheets

METHOD AND SYSTEM FOR MONITORING MOBILE GAME MACRO USER

CROSS REFERENCE TO RELATED APPLICATION

This application claims priority from and benefits of Korean Patent Application No. 10-2020-0018625, filed on Feb. 14, 2020, which are hereby incorporated by reference for all purposes as if fully set forth herein.

BACKGROUND OF THE DISCLOSURE

Field of the Disclosure

The present disclosure relates to a method and system for monitoring a user using a mobile game macro. More specifically, the present disclosure relates to a method and system for monitoring a user using a mobile game macro that identifies a macro user and suppresses the macro use when use of a game macro is found while executing a mobile game using an emulator.

Related Art

In general, smart devices such as a smart phone, a tablet personal computer (PC), and a personal digital assistant (PDA) may install and execute an application program (hereinafter, referred to as an 'application') having a specific purpose and function in a device.

A computer game is a game that entertains a player by enabling a processor to perform predetermined operations and typically displaying the result thereof on a screen or a display device while the player interacts with a computing device.

However, with the recent development of a mobile environment, mobile games executing in smart devices among computer games are attracting attention, and the market thereof is also growing.

However, with the rapid development of mobile game technology, high-performance mobile games are being released, and thus, users using old smart devices have difficulty in executing latest mobile games.

Further, some of the recently released mobile games need to be played only in important situations with a certain term, and there are cases where it is necessary to simultaneously play a plurality of mobile games. In this case, a user working with a personal computer has to continuously check smart devices while working, and thus there is a problem that work efficiency is deteriorated.

To this end, an emulator capable of executing a mobile game on a personal computer has been developed and serviced.

Such an emulator provides a function of generating a virtual smart device in the personal computer using some resources of the personal computer and executing a mobile game in the virtual smart device in the same manner as an environment executing in an existing smart device.

However, one of characteristics of a mobile game is that a long play time is required and that a difference in compensation according to the play time occurs. Further, in the case of a recent massive multiplayer online role playing game (MMORPG), leveling up and item acquisition through repetitive monster hunting is already a formalized content. Thereby, some hackers have developed a program that enables the personal computer to repeatedly play the game while a gamer is away through the development of macros or auto programs that can replace repetitive gameplay.

In such mobile games, use of macros is not only used as a level of personal reduction of efforts to obtain high levels or rewards, but is used for commercial purposes, thereby interfering with the flow of play in the game and encouraging offline transactions by users to cause damage to both producers and users. Further, this is unfair competition, which causes an abnormal situation in which good gamers cannot beat the competition in the game in a normal way. This greatly reduces an element of 'competition', which influences the overall fun of the game.

PRIOR ART DOCUMENT

Patent Document (Patent Document 1) Korean Patent Application Laid-open No. 10-2007-0039415

SUMMARY

The present disclosure provides a method and system for monitoring a user using a mobile game macro capable of identifying a macro user when use of a game macro is detected while executing a mobile game using an emulator.

The present disclosure further provides a method and system for monitoring a user using a mobile game macro capable of suppressing use of a mobile game macro.

The present disclosure further provides a method and system for monitoring a user using a mobile game macro capable of identifying a plurality of macro users and suppressing use of mobile game macros when use of game macros is found while executing a mobile game using a plurality of emulators.

DESCRIPTION OF EXEMPLARY EMBODIMENTS

The present disclosure may apply various transformations and have various embodiments, and specific embodiments will be illustrated in the drawings and described in detail in the detailed description. Effects and features of the present disclosure, and a method of achieving them will be apparent with reference to the embodiments described later in detail together with the drawings. However, the present disclosure is not limited to the embodiments disclosed below and may be implemented in various forms. In the following embodiments, terms such as first and second are used for the purpose of distinguishing one constituent element from other constituent elements rather than a limiting meaning. Further, expressions in the singular include plural expressions unless the context clearly indicates otherwise. Further, terms such as "include" or "have" mean that the features or components described in the specification are present, and do not preclude the possibility that one or more other features or components may be added. Further, in the drawings, the size of components may be exaggerated or reduced for convenience of description. For example, the sizes and thicknesses of each component shown in the drawings are arbitrarily shown for convenience of description, and thus the present disclosure is not necessarily limited to what is shown.

Hereinafter, embodiments of the present disclosure will be described in detail with reference to the accompanying drawings, and when describing with reference to the drawings, the same reference numerals are assigned to the same or corresponding components, and redundant descriptions thereof will be omitted.

<Mobile Game Macro User Monitoring System 1>

Figure 1:
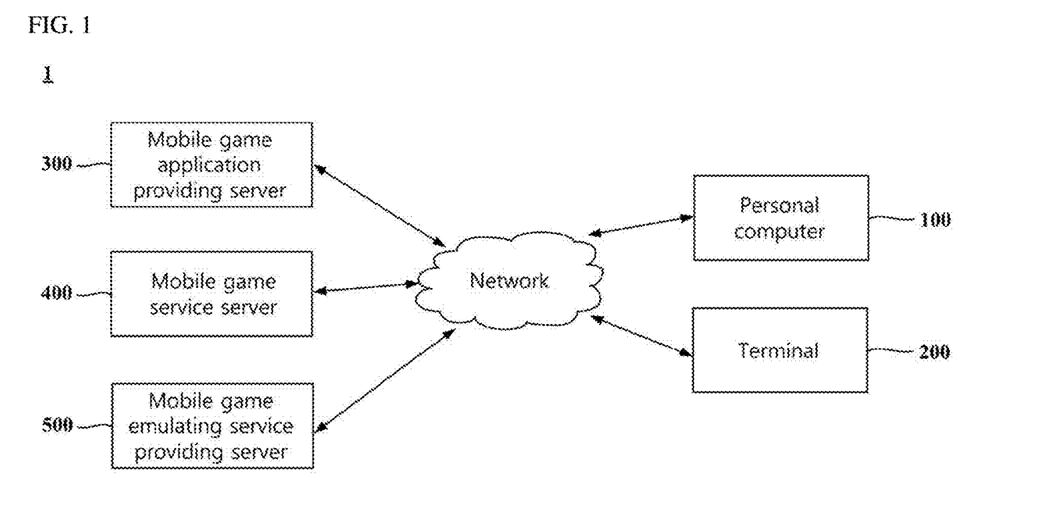
FIG. 1 is a block diagram illustrating a configuration of a mobile game macro user monitoring system according to an embodiment of the present disclosure.
Figure 2:
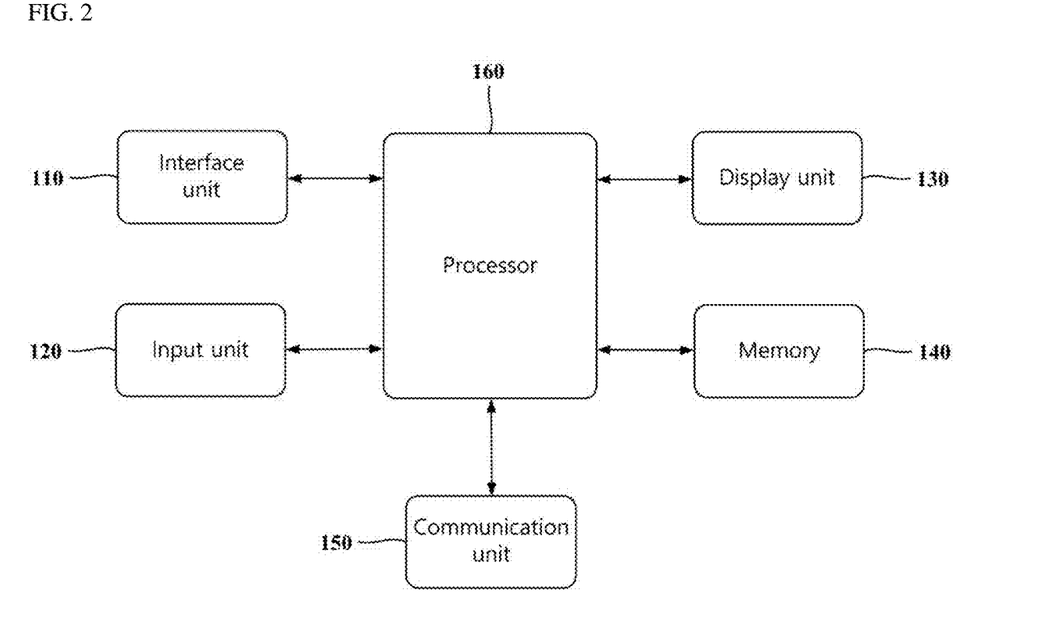
FIG. 2 is a block diagram illustrating a configuration of a personal computer according to an embodiment of the present disclosure.

FIG. 1 is a block diagram illustrating a configuration of a mobile game macro user monitoring system according to an embodiment of the present disclosure, and FIG. 2 is a block diagram illustrating a configuration of a personal computer according to an embodiment of the present disclosure.

Referring to FIG. 1, a mobile game macro user monitoring system 1 according to an embodiment may include a personal computer 100, a terminal 200, a mobile game application providing server 300, a mobile game service server 400, and a mobile game emulating service providing server 500.

Mobile Game Application Providing Server 300

First, when an application provider registers an application, the mobile game application providing server 300 is a server that transmits the registered application according to a request of the terminal 200 and the personal computer 100, and may be at least one of an operating system or a manufacturer of the terminal 200, or an application store operated by a communication company.

Here, the application may correspond to any application program installed in the terminal 200 to perform an additional function, and for example, a mobile game application, a web browser application, a messenger application, and the like may correspond thereto.

Hereinafter, for convenience of description, a mobile application is limited to a mobile game, but hereinafter, the description of a mobile game may be applied to other general applications that a person skilled in the art can easily invent.

Mobile Game Service Server 400

Next, the mobile game service server 400 is a server that transmits and receives data necessary for executing the mobile game to and from the terminal 200 and the personal computer 100 and may be a server operating by a mobile game provider.

The mobile game service server 400 may provide a mobile game service so that the mobile game is appropriate to be executed in the terminal 200.

Further, the mobile game service server 400 may monitor a user using a mobile game macro in the personal computer 100. When use of the mobile game macro is detected, the mobile game service server 400 may suppress the user's use of the mobile game macro. A detailed method for the mobile game service server 400 to monitor and suppress use of a mobile game macro in the personal computer 100 will be described later.

The mobile game service server 400 is at least one computing device including at least one memory and at least one processor, and a processor may perform a method of executing a program stored in a memory to monitor and suppress use of a mobile game macro.

Mobile Game Emulating Service Providing Server 500

Next, the mobile game emulating service providing server 500 may be a server that provides an emulator to execute the mobile game in the mobile game execution apparatus 100, which is a personal computer (PC).

In detail, the mobile game emulating service providing server 500 may transmit an emulator, which is a program compatible with the mobile game to be executed on a personal computer, and transmit and receive necessary data to and from the personal computer after the emulator is executed.

Further, the mobile game emulating service providing server 500 may execute the emulator in the personal computer and then transmit and receive data necessary for executing a multi-display function to and from the personal computer.

Terminal 200

Next, the terminal 200 may be a device that executes a mobile game.

Because the mobile game is produced for the terminal 200, the terminal 200 may download and execute the mobile game from the mobile game application providing server 300 without a separate emulator module.

Such a terminal 200 may include a smart phone, a mobile phone, a digital broadcasting terminal 200, a personal digital assistant (PDA), a portable multimedia player (PMP), a navigation device, a tablet PC, a wearable device, and a glass-type terminal (smart glass).

Personal Computer 100

Next, the personal computer 100 may be a device that installs a separate emulator module operated in an operating system module and that executes a mobile game through the emulator module. Further, the personal computer 100 may be a device that installs a separate monitoring module operated in an operating system module and that executes the monitoring module when the emulator module is executed.

In detail, the personal computer 100 is a personal computer such as a desktop PC, a laptop computer, and an ultrabook, and has different specifications and operating systems from those of a mobile game, and even if a mobile game is downloaded from the mobile game application providing server, the personal computer 100 cannot execute the mobile game.

Therefore, the personal computer 100 may download an emulator module, which is an auxiliary program that executes the mobile game, from the emulating service providing server 500 (or from a separate server), then execute the emulator module, and execute the mobile game through the executed emulator module. Here, the emulator module may be at least a part of an emulator program that enables an application operating in the mobile device to be executed in the personal computer 100 operating in an operating system different from that of the mobile device.

In detail, the personal computer 100 may download the emulator module from the mobile game emulating service providing server 500 and install the emulator module in a memory, and then the processor may execute the emulator module to generate a virtual terminal operating as a mobile operating system in an operating system.

Thereafter, the personal computer 100 may access the mobile game application providing server 300 through the generated virtual terminal to download and install the mobile game application, and the processor may execute a mobile game with a virtual terminal operating with a mobile operating system to exchange data with the mobile game service server 400 and to execute the mobile game.

Further, when the mobile game is executed by the virtual terminal of the emulator module, the processor of the personal computer 100 may receive a request for installing a monitoring module from the mobile game. The personal computer 100 may download and install the monitoring module from the mobile game service server 400 according to a request for installing the monitoring module, and then execute the monitoring module.

Here, the monitoring module may be at least a part of a security program capable of monitoring a virtual terminal executing in an operating system of the personal computer 100 to operate with a mobile operating system or/and a mobile game application executed through the virtual terminal.

Accordingly, a monitoring module may be installed and stored in the memory, and the processor may read and execute the monitoring module from the memory based on the operating system of the personal computer 100 to perform monitoring of the virtual terminal or/and the mobile game application.

Personal Computer Configuration

The personal computer 100 may include an interface unit 110, an input unit 120, a display unit 130, a memory 140, a communication unit 150, and a processor 160. However, the components illustrated in FIG. 2 are not essential in implementing the personal computer 100 and thus the personal computer 100 described in the present specification may have more or fewer components than the components listed above.

Specifically, first, the interface unit 110 may serve as a data path of various types of external devices connected to the personal computer 100. For example, the interface unit 110 may be connected to input devices (e.g., mouse, keyboard, etc.) to receive a user's input.

Further, the interface unit 110 may be connected to a display device (e.g., monitor) to serve to transmit graphic images.

The interface unit 110 may include at least one of a wired/wireless headset port, an external charger port, a wired/wireless data port, a memory card port, a port to connect a device equipped with an identification module, an audio input/output (I/O) port, a video input/output (I/O) port, and an earphone port. Further, the interface unit 110 may include a short-range wireless communication module such as Bluetooth or Wi-Fi.

Next, the input unit 120 may detect a user input.

In detail, the input unit 120 may detect an execution input that turns on/off the personal computer 100, settings for various emulator modules, settings for execution inputs and mobile games, settings for execution inputs and monitoring modules, execution inputs, and the like.

For example, the input unit 120 may include various buttons disposed at the personal computer 100. Further, the input unit 120 may include a touch sensor coupled together with the display unit 130 or the display device. Further, the input unit 120 may include input devices such as a mouse and a keyboard connected through the interface unit 110.

Next, the display unit 130 may display a graphic image.

In detail, the display unit 130 may display a graphic image related to an emulator module, a graphic image related to a mobile game, a graphic image related to a monitoring module, and the like.

The display unit 130 may be a display mounted on a personal computer or a display device connected through the interface unit 110.

Further, the display unit 130 may include at least one of a liquid crystal display (LCD), a thin film transistor-liquid crystal display (TFT LCD), an organic light-emitting diode (OLED), a flexible display, a 3D display, and an e-ink display.

Next, the memory 140 may store a plurality of application programs operating in the personal computer 100 and data and instructions for an operation of the personal computer 100.

In detail, the memory 140 may store a program related to an emulator module for operating a mobile game, and store a monitoring module that monitors a mobile game application and a mobile game macro program executable through the emulator and that identifies a mobile game user.

The memory 140 may be various storage devices such as a read-only memo (ROM), random-access memory (RAM), erasable programmable read only memory (EPROM), flash drive, hard drive, and the like and be a web storage that performs a storage function of the memory 140 on the Internet.

Next, the communication unit 150 may perform wired/wireless communication with at least one of the mobile application providing server 300, the mobile game service server 400, and the mobile game emulating service providing server 500.

In detail, the communication unit 150 may download a mobile game application from the mobile game application providing server 300, transmit and receive various data for mobile game execution with the mobile game service server 400 and various data for identifying and suppressing a mobile game macro user, receive an emulator from the mobile game emulation providing server, and transmit and receive various data necessary for executing the emulator.

Finally, the personal computer 100 may include a processor 160 that controls the overall operation of each unit to execute an emulator module, a mobile game, and a monitoring module.

In detail, the processor 160 may execute the emulator module, generate a virtual terminal through the emulator module, and then execute a mobile game through the generated virtual terminal. Further, the processor 160 may execute the monitoring module, detect a mobile game macro program through the monitoring module, identify a user of the mobile game when the mobile game macro program is detected, and forcibly end the mobile game of the identified user.

The processor 160 may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

<Method of Monitoring a Mobile Game Macro User According to an Embodiment>

Figure 3:
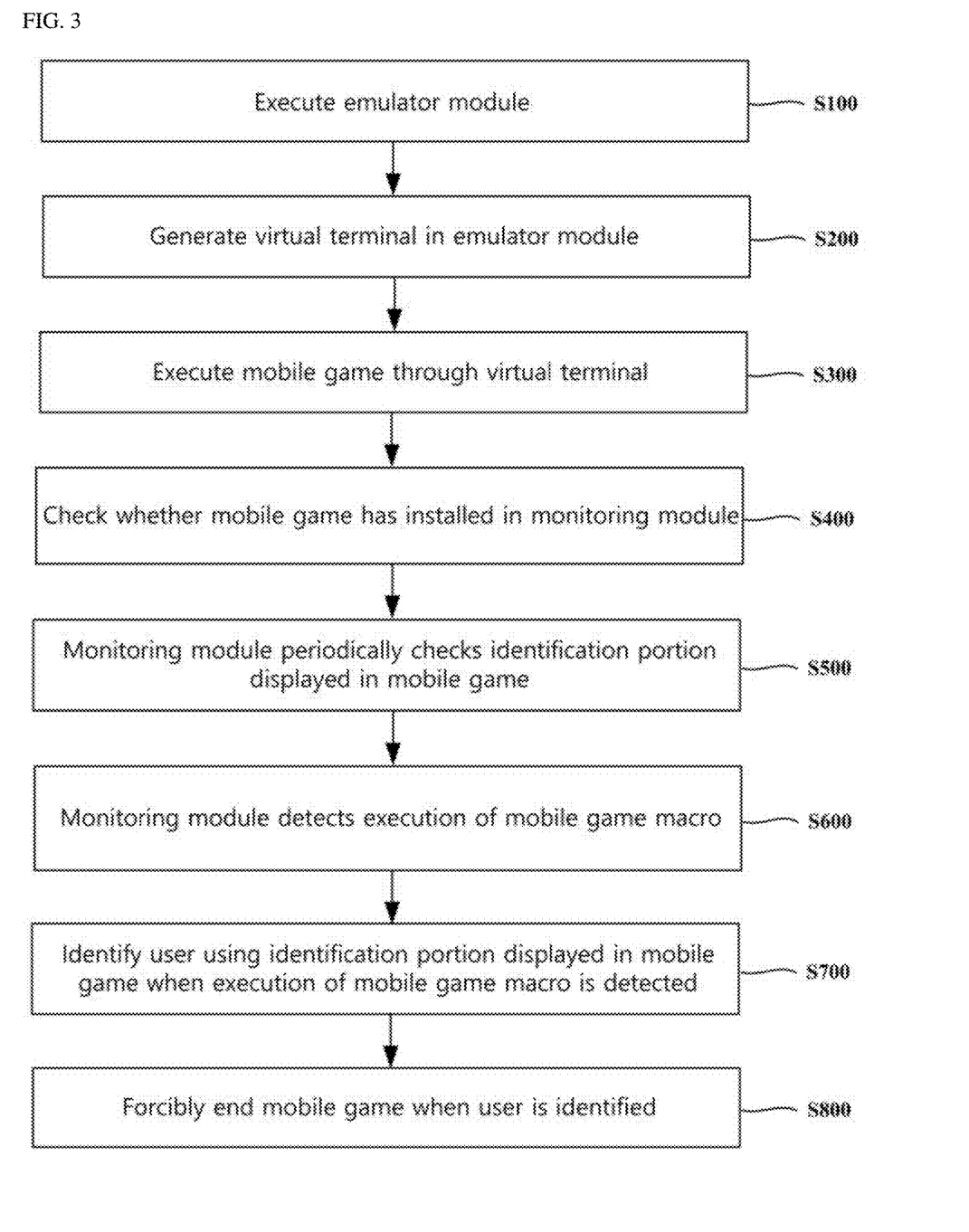
FIG. 3 is a flowchart illustrating a method of monitoring a mobile game macro user according to an embodiment of the present disclosure.
Figure 4:
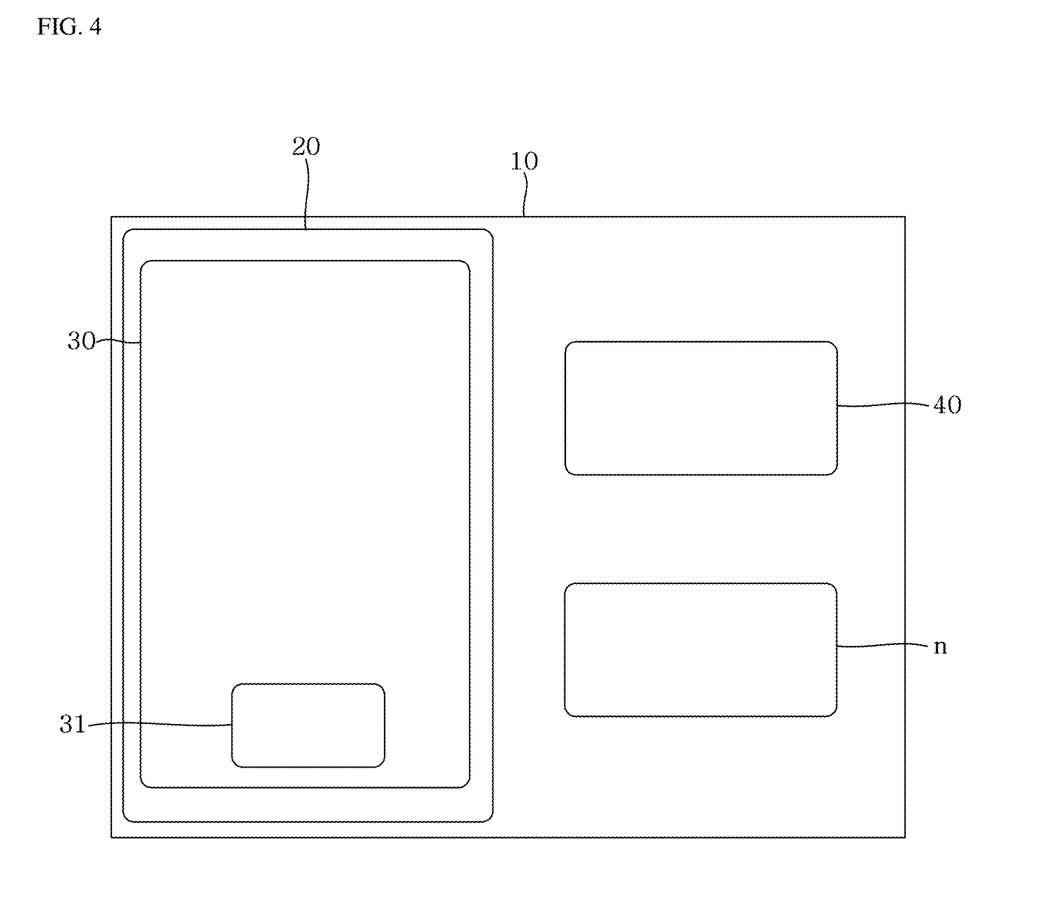
FIG. 4 illustrates a screen of a display unit when monitoring a mobile game macro user according to an embodiment of the present disclosure.
Figure 5:
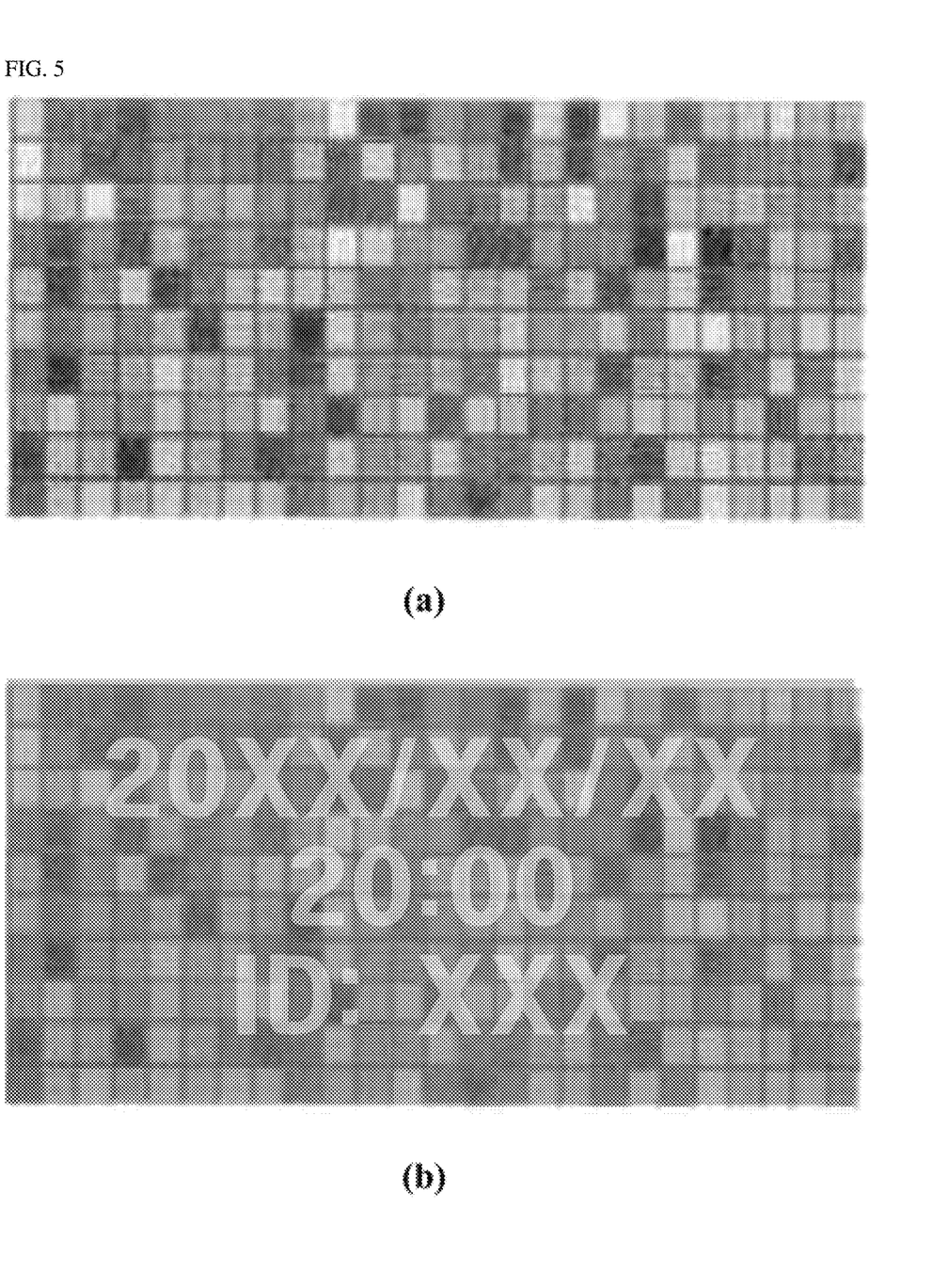
FIG. 5 is a diagram illustrating steganography, which is an example of an identification portion according to an embodiment of the present disclosure.
Figure 6:
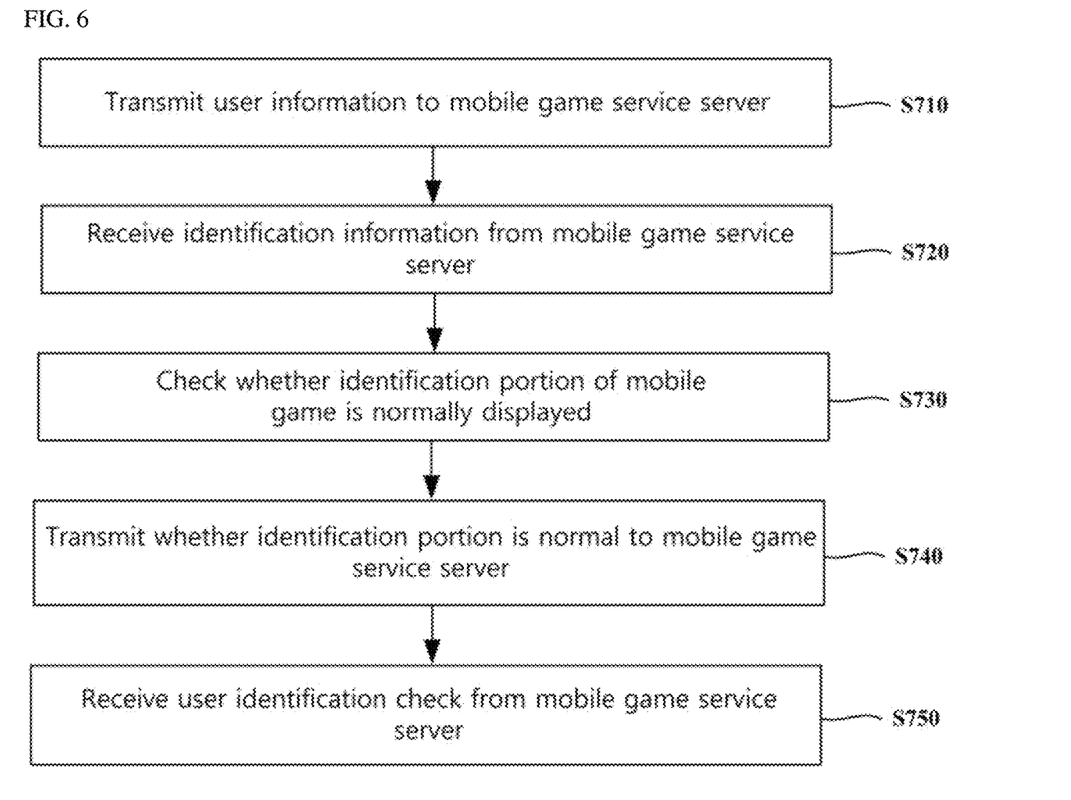
FIG. 6 is a flowchart illustrating a method of identifying a user using an identification portion of FIG. 3.

FIG. 3 is a flowchart illustrating a method of monitoring a mobile game macro user according to an embodiment of the present disclosure, FIG. 4 illustrates a screen of a display unit when monitoring a mobile game macro user according to an embodiment of the present disclosure, FIG. 5 is a diagram illustrating steganography, which is an example of an identification portion according to an embodiment of the present disclosure, and FIG. 6 is a flowchart illustrating a method of identifying a user using an identification portion of FIG. 3.

In the method of monitoring a mobile game macro user according to an embodiment of the present disclosure, a process in which the processor 160 of the personal computer 100 monitors a user using a mobile game macro M for a mobile game application 30 (hereinafter, 'mobile game') executed through an emulator module 20 using a monitoring module program 40 (hereinafter, 'monitoring module') executed in an operating system based on an operation of the personal computer 100 will be described.

In the following description, the operation of the processor 160 according to instructions of the mobile game 30 implies that the mobile game 30 operates, and similarly, the emulator module 20 and the monitoring module 40 are also executed by the processor 160, but it will be described by implying that the emulator module 20 and the monitoring module 40 operate directly.

Referring to FIGS. 3 and 4, the method of monitoring a mobile game macro user according to an embodiment of the present disclosure may include step S100 in which the processor 160 executes the emulator module 20 of the memory. More specifically, the emulator module 20 may be installed on an operating system module 10 of the memory of the personal computer 100. The processor 160 may execute the emulator module 20 using the operating system module 10.

Further, the method of monitoring a mobile game macro user according to an embodiment of the present disclosure may include step S200 of generating a virtual terminal in the emulator module 20.

More specifically, because the mobile game 30 is a terminal-only application, the mobile game 30 cannot be executed on the operating system module 10 of the personal computer 100. Accordingly, the emulator module 20 may generate a virtual terminal of a mobile operating system having an environment in which the mobile game 30 can be executed.

Further, the method of monitoring a mobile game macro user according to an embodiment of the present disclosure may include step S300 of executing the mobile game 30 through a virtual terminal.

Further, the method of monitoring a mobile game macro user according to an embodiment of the present disclosure may include step S400 in which the mobile game 30 checks whether the monitoring module 40 has installed.

More specifically, the mobile game 30 may determine whether the mobile game 30 is being executed in an actual terminal or in a virtual terminal through an emulator module.

For example, the mobile game 30 may determine whether an executing communication environment is a communication environment for an actual terminal or a communication environment for a personal computer to determine whether the mobile game 30 is being executed in a virtual terminal through an emulator module.

If the mobile game 30 is being executed in a virtual terminal through the emulator module, the mobile game 30 may check whether the monitoring module 40 is installed on the operating system module 10.

In this case, if the monitoring module 40 is not installed on the operating system module 10, the mobile game 30 may stop execution and request or proceed installation of the monitoring module 40. However, in another embodiment, because the mobile game 30 is executed on a mobile operating system and the mobile game 30 may not determine whether the monitoring module 40 is installed in the operating system module 10, the mobile game 30 may delegate to the emulator module 20 whether the monitoring module 40 is installed.

That is, when the mobile game 30 is executed, if the emulator module 20 detects whether the monitoring module 40 is installed in the operating system module 10, the emulator module 20 may proceed execution of the mobile game 30 and if the monitoring module 40 is not installed in the operating system module 10, the emulator module 20 may stop execution of the mobile game 30.

Further, the monitoring module 40 executed in the operating system module 10 may be provided in the mobile game service server 400. Further, the monitoring module 40 may have administrator rights in the operating system module 10.

As an example, the monitoring module 40 may detect a virtual machine (VM) using administrator rights. This is because when a VM is installed in the personal computer 100 and a mobile game is executed using the VM, the monitoring module 40 cannot recognize the mobile game and cannot detect the mobile game macro program in the VM.

In this case, the monitoring module 40 may prevent the mobile game from being executed. As another example, even if the mobile game is not executed using the administrator authority, when the operating system module 10 is executed, the monitoring module 40 may be automatically executed.

Further, the method of monitoring a mobile game macro user according to an embodiment of the present disclosure may include step S500 in which the monitoring module 40 periodically checks the identification portion 31 displayed in the mobile game 30.

More specifically, as illustrated in FIG. 4, an identification portion display area 31 may be located at the bottom of the mobile game display area 30, but the present disclosure is not limited thereto and the identification portion display area 31 may be disposed regardless of any area on the mobile game display area 30.

The identification portion 31 displayed in the identification portion display area may be displayed including user information.

Here, the user information may include identification portion generation time information or a user's unique ID information. That is, the identification portion 31 may include a configuration capable of checking an account of a user who executes the mobile game 30.

In an embodiment, the identification portion 31 may display a configuration representing user information in the form of a watermark.

Further, the identification portion 31 may be encoded so that the user cannot recognize it. For example, the identification portion 31 may encode and display a configuration representing user information by steganography. Here, steganography is a deep encoding technique that encodes and hides user information to transfer in an image file.

As illustrated in FIG. 5, the mobile game 30 may display an encoded identification portion a. When the mobile game service server 400 decodes the encoded identification portion a, user information may be known, as illustrated in FIG. 5B.

An encoding method of the identification portion a may use a color code method.

In detail, the mobile game 30 may modulate a configuration representing user information to transfer by performing a color code encoding method into a first color pixel in a predetermined range, and synthesize the modulated first color pixel and an arbitrary second color pixel to form one steganographic image.

The mobile game service server 400 may extract a message to transfer by demodulating a steganographic image to a predetermined range of color pixels through a decoding code for demodulating a color code.

Further, in order to give the identity of the steganography, which is the identification portion 31, the mobile game 30 may receive periodically a unique key such as a universally unique identifier (UUID) or a globally unique identifier (GUID) from the mobile game service server 400 when executing the game.

Further, when generating steganography by combining the unique key with a configuration representing the user information, the mobile game 30 may encode together a steganography generation time.

The present disclosure is not limited thereto, and the user information may include additional information other than the identification portion generation time information or the user's unique ID information.

In the embodiment, when the monitoring module 40 checks the identification portion 31 periodically displayed in the mobile game 30, the monitoring module 40 may check that the monitoring module 40 and the mobile game 30 are being executed on the same personal computer 100.

According to the embodiment, the monitoring module 40 may periodically receive a color code decoding code according to the unique key from the mobile game service server 400, and decode the identification portion 31 to obtain the user information and a color code generation time. The monitoring module 40 may compare the color code generation time with a current time to check whether the color code generation time is within a predetermined time, and thus check whether the monitoring module 40 and the mobile game 30 are being executed on the same personal computer 100.

Further, the monitoring module 40 may store user information such as a user account at the time of login according to execution of the virtual terminal of the emulator module 20 or/and at the time of login for execution of a mobile game, and then compare the user information with user information obtained through decoding to check whether the monitoring module 40 and the mobile game 30 are being executed on the same personal computer 100.

Further, the method of monitoring a mobile game macro user according to an embodiment of the present disclosure may include step S600 in which the monitoring module 40 detects execution of a mobile game macro M. More specifically, the mobile game macro M may be executed on the operating system module 10.

The mobile game macro M may be a program that executes the mobile game 30 executed through the emulator module 20 instead of the user. That is, the mobile game macro M may be an illegal program that causes damage to the manufacturer and other users.

The monitoring module 40 may detect the mobile game macro M installed or executed on the operating system module 10. A detailed method for the monitoring module 40 to detect the mobile game macro M may follow the prior art.

In an embodiment, when the monitoring module 40 detects a first program that transmits and receives data to and from the virtual terminal of the emulator module 20 on the operating system module 10, the monitoring module 40 may detect the first program with the mobile game macro M.

Further, in an embodiment, when a second program executed on the operating system module 10 generates a signal corresponding to a user input on the virtual terminal display screen, the monitoring module 40 may detect the second program with the mobile game macro M.

Further, the method of monitoring a mobile game macro user according to an embodiment of the present disclosure may include step S700 in which the monitoring module 40 identifies a user using the identification portion 31 displayed in the mobile game 30 when execution of the mobile game macro M is detected.

More specifically, referring to FIG. 6, the method S700 of identifying a user using an identification portion may include step S710 in which the mobile game 30 transmits user information to the mobile game service server 400.

Further, the method S700 of identifying a user using the identification portion may include step S720 in which the monitoring module 40 receives identification information based on user information from the mobile game service server 400.

In detail, the mobile game service server 400 may search for an IP address of the personal computer 100 that matches the received user information. The mobile game service server 400 may generate identification information based on user information with the found IP address.

As an example, the identification information may be a message of the identification portion 31 generated using a user's unique key. The mobile game service server 400 may transmit the generated identification information to the monitoring module 40.

Further, the method S700 of identifying a user using the identification portion 31 may include step S730 in which the monitoring module 40 checks whether the identification portion 31 of the mobile game 30 is normally displayed based on the identification information.

For example, the monitoring module 40 may compare the displayed identification portion 31 with the user's unique ID information and unique ID information of the identification information among the decoded messages to check whether they are identical.

Further, the method S700 of identifying a user using the identification portion 31 may include step S740 in which the monitoring module 40 transmits whether the identification portion 31 of the mobile game 30 is normal to the mobile game service server 400.

Further, the method S700 of identifying a user using the identification portion 31 may include step S750 in which the monitoring module 40 receives user identification check from the mobile game service server 400.

That is, if the identification portion 31 is normal according to whether the identification portion 31 checked by the monitoring module 40 is normal, the mobile game service server 400 may transmit a message indicating that the user identification has been checked to the monitoring module 40 and identify a user using a mobile game macro.

Further, the method of monitoring a mobile game macro user according to an embodiment of the present disclosure may include step S800 of forcibly ending the mobile game when a user using the mobile game macro is identified. For example, the mobile game service server 400 may forcibly end a mobile game of a user using a mobile game macro or stop providing a mobile game service.

Accordingly, the method of monitoring a user using a mobile game macro according to an embodiment of the present disclosure may identify a macro user when use of the game macro is found while executing a mobile game using the emulator module 10. Further, the method of monitoring a user using a mobile game macro according to an embodiment of the present disclosure can suppress use of the mobile game macro.

Figure 7:
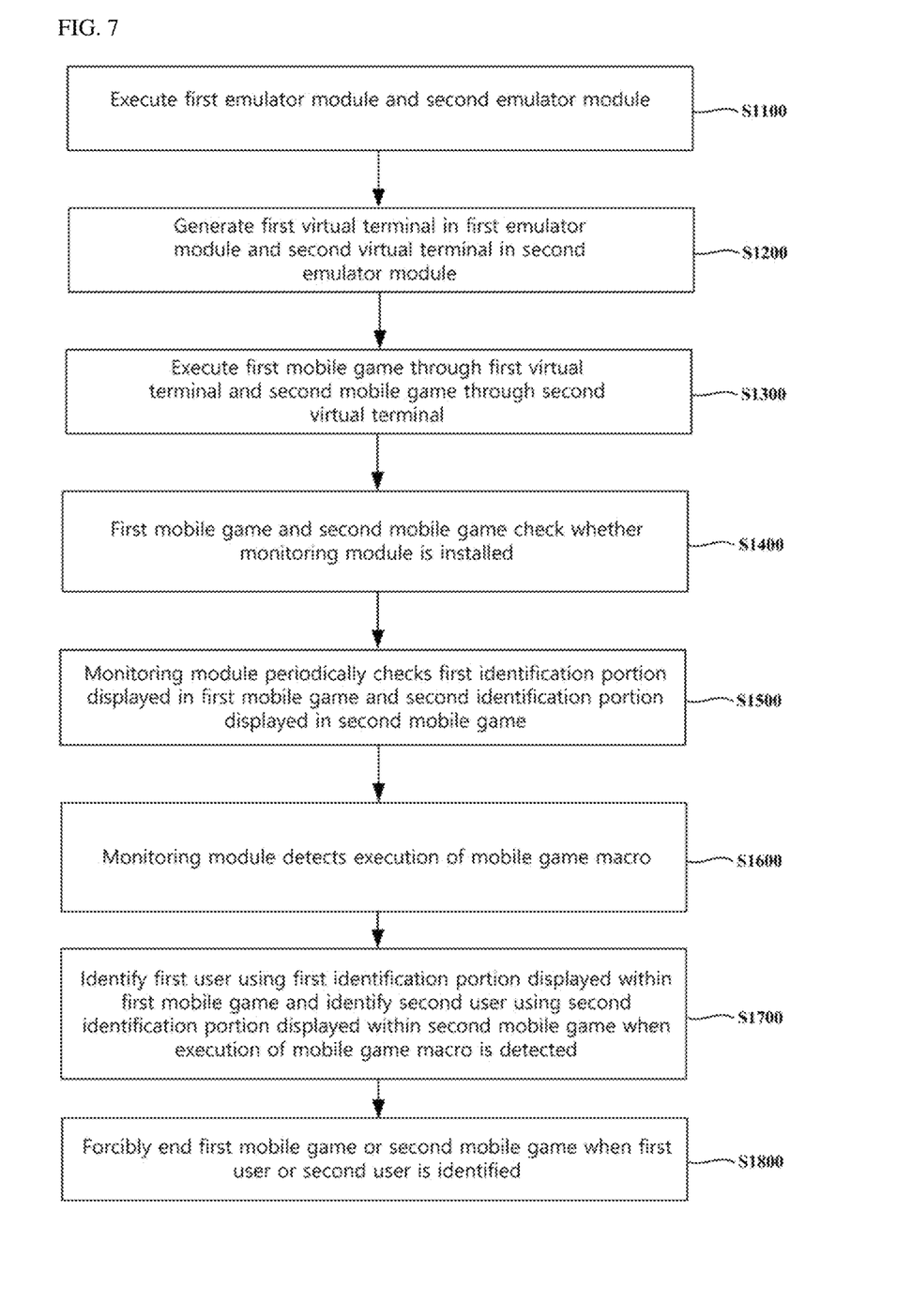
FIG. 7 is a flowchart illustrating a method of monitoring a mobile game macro user according to another embodiment of the present disclosure.
Figure 8:
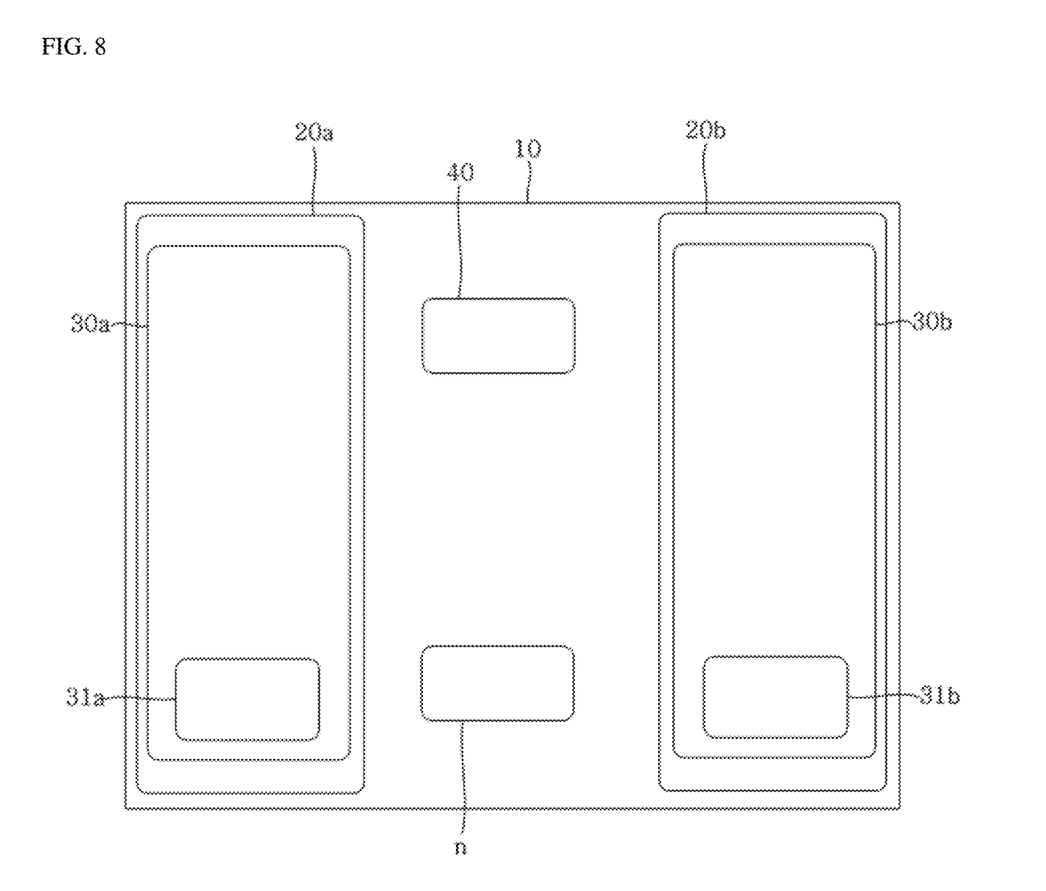
FIG. 8 illustrates a display screen when monitoring a mobile game macro user according to another embodiment of the present disclosure.
Figure 9:
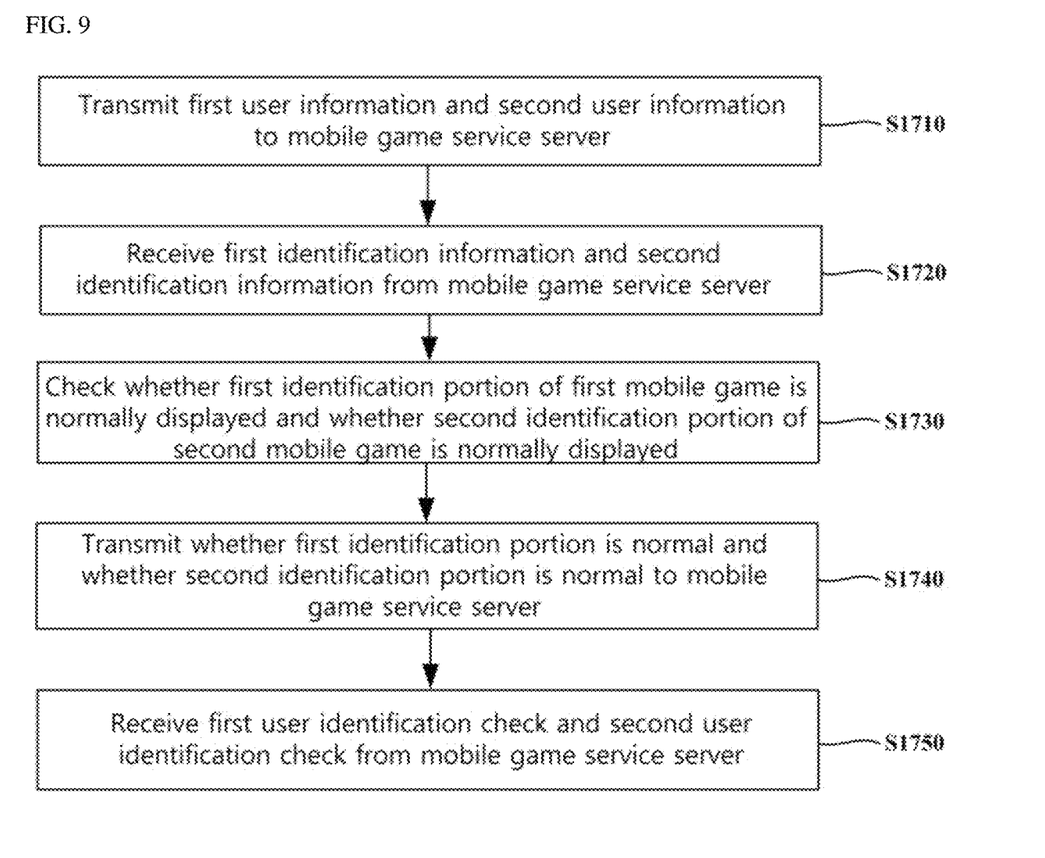
FIG. 9 is a flowchart illustrating a method of identifying a user using an identification portion of FIG. 7.

FIG. 7 is a flowchart illustrating a method of monitoring a mobile game macro user according to another embodiment of the present disclosure, FIG. 8 illustrates a display screen when monitoring a mobile game macro user according to another embodiment of the present disclosure, and FIG. 9 is a flowchart illustrating a method of identifying a user using an identification portion of FIG. 7.

Referring to FIG. 7, in the method of monitoring a mobile game macro user according to another embodiment of the present disclosure, the processor 160 of the personal computer 100 may monitor a user using a mobile game macro M for a first mobile game 30a executed through a first emulator module 20a or a second mobile game 30b executed through a second emulator module 20b using the monitoring module 40.

Referring to FIGS. 7 and 8, the method of monitoring a mobile game macro user according to another embodiment of the present disclosure may include step S1100 of executing the first emulator module 20a and the second emulator module 20b. More specifically, the first emulator module 20a and the second emulator module 20b may be installed on the operating system module 10 of the personal computer 100. The processor 160 may execute the first emulator module 20a or the second emulator module 20b using the operating system module 10.

Further, the method of monitoring a mobile game macro user according to another embodiment of the present disclosure may include step S1200 of generating a first virtual terminal in the first emulator module 20a and generating a second virtual terminal in the second emulator module 20b. More specifically, because the first mobile game 30a and the second mobile game 30b are terminal-only applications, the first mobile game 30a and the second mobile game 30b cannot be executed on the operating system module 10 of the personal computer 100. Accordingly, the first emulator module 20a may generate a first virtual terminal having an environment in which the first mobile game 30a may be executed. Further, the second emulator module 20b may generate a second virtual terminal having an environment in which the second mobile game 30b may be executed.

Further, the method of monitoring a mobile game macro user according to another embodiment of the present disclosure may include step S1300 of executing the first mobile game 30a through the first virtual terminal and executing the second mobile game 30b through the second virtual terminal.

Further, the method of monitoring a mobile game macro user according to another embodiment of the present disclosure may include step S1400 in which the first mobile game 30a and the second mobile game 30b check whether the monitoring module 40 is installed.

More specifically, the first mobile game 30a and the second mobile game 30b may determine whether the first mobile game 30a and the second mobile game 30b are being executed in an actual terminal or in a virtual terminal through an emulator module.

For example, the first mobile game 30a and the second mobile game 30b may determine whether an executing communication environment is a communication environment related to an actual terminal or a communication environment related to a personal computer to determine whether the first mobile game 30a and the second mobile game 30b are executed in a virtual terminal through an emulator module.

When the first mobile game 30a and the second mobile game 30b are executed in a virtual terminal through an emulator module, the first mobile game 30a and the second mobile game 30b may check whether the monitoring module 40 is installed on the operating system module 10.

In this case, when the monitoring module 40 is not installed, the first mobile game 30a and the second mobile game 30b may stop execution and request or proceed to install the monitoring module 40.

Further, the monitoring module 40 may be provided in the mobile game service server 400. Further, the monitoring module 40 may have administrator rights in the operating system module 10. As an example, the monitoring module 40 may detect a virtual machine (VM) using administrator rights. This is because when a VM is installed in the personal computer 100 and a mobile game is executed using the VM, the monitoring module 40 cannot recognize the mobile game and cannot detect the mobile game macro program in the VM. In this case, the monitoring module 40 may prevent the mobile game from being executed.

As another example, even if the mobile game is not executed using the administrator authority, when the operating system module 10 is executed, the monitoring module 40 may be automatically executed.

Further, the method of monitoring a mobile game macro user according to another embodiment of the present disclosure may include step S1500 in which the monitoring module 40 periodically checks a first identification portion 31a displayed in the first mobile game 30a and a second identification portion 31b displayed in the second mobile game 30b.

More specifically, as illustrated in FIG. 8, the first identification portion 31a and the second identification portion 31b may be located at the lower end of the first mobile game 30a and the second mobile game 30b, respectively, but the present disclosure is limited thereto and the first identification portion 31a and the second identification portion 31b may be disposed regardless of an area on the first mobile game 30a and the second mobile game 30b, respectively.

The first identification portion 31a and the second identification portion 31b may include first user information and second user information, respectively. The first user information and the second user information may include each identification portion generation time information or user's unique ID information.

That is, the first identification portion 31a and the second identification portion 31b may be configured to distinguish the first user and the second user. Further, the first identification portion 31a and the second identification portion 31b may be recognized in the form of a watermark. Further, the first identification portion 31a and the second identification portion 31b may be encoded so that the user cannot recognize them.

For example, the first identification portion 31a and the second identification portion 31b may be steganography. Steganography is a deep encoding technique that encodes and hides user information to transfer in an image file. As illustrated in FIG. 5, the first mobile game 30a and the second mobile game 30b may display an encoded identification portion a. When the encoded identification portion a is decoded, user information may be identified, as illustrated in FIG. 5B.

An encoding method of the identification portion a may use a color code. The color code may modulate a message to transfer into a color pixel in a predetermined range, and the modulated color pixel and an arbitrary color pixel may be configured together in a single steganographic image.

The color code may demodulate a steganographic image into color pixels in a predetermined range to extract a message to transfer. Further, in order to give the uniqueness of the steganography, which is the first identification portion 31a and the second identification portion 31b, the first mobile game 30a and the second mobile game 30b may receive a unique key, such as an UUID or a GUID from the server.

When the first mobile game 30a and the second mobile game 30b generate steganography using each unique key, the first mobile game 30a and the second mobile game 30b may encode together a steganography generation time. The present disclosure is not limited thereto, and the user information may include additional information other than identification portion generation time information or the user's unique ID information.

When the monitoring module 40 checks the first identification portion 31a periodically displayed in the first mobile game 30a or the second identification portion 31b periodically displayed in the second mobile game 30b, the monitoring module 40 may check that the monitoring module 40 and the first mobile game 30a or the monitoring module 40 and the second mobile game 30b are being executed on the same personal computer 100.

Further, the method of monitoring a mobile game macro user according to another embodiment of the present disclosure may include step S1600 in which the monitoring module 40 detects execution of the mobile game macro M. More specifically, the mobile game macro M may be executed on the operating system module 10. The mobile game macro M is a program that executes the first mobile game 30a or the second mobile game 30b executed through the emulator module 20 on behalf of the user.

That is, the mobile game macro M is an illegal program that causes damage to a manufacturer and other users. The monitoring module 40 may detect the mobile game macro M installed or executed on the operating system module 10. A detailed method for the monitoring module 40 to detect the mobile game macro M may follow the prior art.

Further, the method of monitoring a mobile game macro user according to another embodiment of the present disclosure may include step S1700 in which the monitoring module 40 identifies a first user using the first identification portion 31a displayed within the first mobile game 30a and identifies a second user using the second identification portion 31b displayed within the second mobile game 30b when execution of the mobile game macro M is detected.

More specifically, referring to FIG. 9, the method S1700 of identifying a first user using a first identification portion and identifying a second user using a second identification portion may include step S1710 in which the first mobile game 30a transmits first user information to the mobile game service server 400 and the second mobile game 30b transmits the second user information to the mobile game service server 400.

Further, the method S1700 of identifying a first user using a first identification portion and identifying a second user using a second identification portion may include step S1720 in which the monitoring module 40 receives first identification information based on first user information and receives second identification information based on the second user information from the mobile game service server 400.

In detail, the mobile game service server 400 may search for an IP address of a personal computer that matches the received first user information and an IP address of a personal computer that matches the received second user information.

The mobile game service server 400 may generate first identification information and second identification information based on the first user information and the second user information, respectively, with the found IP address.

As an example, the first identification information and the second identification information may be messages of a first identification portion and a second identification portion generated by using a unique key of a first user and a unique key of a second user, respectively. The mobile game service server 400 may transmit the generated first identification information and second identification information to the monitoring module 40.

Further, the method S1700 of identifying a first user using a first identification portion and identifying a second user using a second identification portion may include step S1730 in which the monitoring module 40 checks whether the first identification portion 31a of the first mobile game 30a is normally displayed based on the first identification information and whether the second identification portion 31b of the second mobile game 30b is normally displayed based on the second identification information.

As an example, the monitoring module 40 may compare unique ID information of the first user with unique ID information of the identification information among decoded messages of the displayed first identification portion 31a and check whether they are the same, and compare unique ID information of the second user and unique ID information of the identification information among decoded messages of the displayed second identification portion 31b and check whether they are the same.

Further, the method S1700 of identifying a first user using a first identification portion and identifying a second user using a second identification portion may include step S1740 in which the monitoring module 40 transmits whether a first identification portion 31a of the first mobile game 30a is normal to the mobile game service server 400 and transmits whether the second identification portion 31b of the second mobile game 30b is normal to the mobile game service server 400.

Further, the method S1700 of identifying a first user using a first identification portion and identifying a second user using a second identification portion may include step S1750 in which the monitoring module 40 receives identification check of the first user and identification check of the second user from the mobile game service server 400.

That is, if the first user identification portion 31a is normal according to whether the first user identification portion 31a checked by the monitoring module 40 is normal, the mobile game service server 400 may transmit a first user identification check message to the monitoring module 40 and identify a first user using the mobile game macro.

Further, if the second identification portion 31b is normal according to whether the second identification portion 31b checked by the monitoring module 40 is normal, the mobile game service server 400 may transmit a second user identification check message to the monitoring module 40 and identify a second user using the mobile game macro.

Further, the method of monitoring a mobile game macro user according to another embodiment of the present disclosure may include step S1800 of forcibly ending the mobile game when a first user or a second user using the mobile game macro is identified.

For example, the mobile game service server 400 may forcibly end a first mobile game of a first user using a mobile game macro or a second mobile game of a second user using a mobile game macro, or may stop providing a mobile game service.

Accordingly, in the method of monitoring a user using a mobile game macro according to another embodiment of the present disclosure, while executing a mobile game using a plurality of emulators, when use of a game macro is found, a plurality of macro users are identified and mobile game macro use may be suppressed.

The above-described embodiments according to the present disclosure may be implemented in the form of program instructions that can be executed through various computer components to be recorded in a computer readable recording medium. The computer readable recording medium may include program instructions, data files, data structures, and the like alone or in combination. The program instructions recorded on the computer readable recording medium may be specially designed and configured for the present disclosure or may be known and usable to those skilled in the computer software field. Examples of computer readable recording media include magnetic media such as hard disks, floppy disks, and magnetic tapes, optical recording media such as CD-ROMs and digital versatile discs (DVDs), magnetic-optical media such as floptical disks, and a hardware device specially configured to store and execute program instructions, such as ROM, RAM, flash memory, and the like. Examples of the program instructions include not only machine language codes such as those produced by a compiler, but also high-level language codes that can be executed by a computer using an interpreter or the like. The hardware device may be changed to one or more software modules to perform the processing according to the present disclosure, and vice versa.

The specific implementations described in the present disclosure are embodiments and do not limit the scope of the present disclosure in any way. For brevity of the specification, descriptions of conventional electronic configurations, control systems, software, and other functional aspects of the systems may be omitted. Further, the connections or connection members of lines between the components shown in the drawings exemplarily represent functional connections and/or physical or circuit connections, and in an actual device, they may be represented as alternative or additional functional connections, physical connections, or circuit connections. Further, if there is no specific mention such as "essential" or "important", it may not be an essential component for the application of the present disclosure.

Further, although the detailed description of the present disclosure has been described with reference to a preferred embodiment of the present disclosure, it will be understood that those skilled in the art or those of ordinary skill in the art can variously modify and change the present disclosure within the scope not departing from the spirit and scope of the present disclosure described in the claims to be described later. Accordingly, the technical scope of the present disclosure should not be limited to the contents described in the detailed description of the specification, but should be determined by the claims.

A method and system for monitoring a user using a mobile game macro of the present disclosure can identify a macro user when use of a game macro is found while executing a mobile game using an emulator.

Further, a method and system for monitoring a user using a mobile game macro of the present disclosure can suppress use of the mobile game macro.

Further, a method and system for monitoring a user using a mobile game macro of the present disclosure can identify a plurality of macro users and suppress use of mobile game macros when use of game macros is found while executing a mobile game using a plurality of emulators.

What is claimed is:

1. A method performed by a processor of a computer comprising:
   executing an emulator module on an operating system module of the computer;
   generating a virtual terminal of a mobile operating system in the executed emulator module;
   executing a mobile game on the mobile operating system through the generated virtual terminal;
   executing a monitoring module, configured to monitor use of a mobile game macro for the mobile game executed in the virtual terminal through the emulator module, on the operating system module of the computer;
   checking, by the executed monitoring module, an identification portion displayed on a display screen of the mobile game;
   detecting, by the executed monitoring module, the use of the mobile game macro for the mobile game; and
   when the use of the mobile game macro is detected, transmitting the identification portion or identification information identified by the identification portion to a mobile game service server.

2. The method of claim 1, further comprising, when the use of the mobile game macro is detected, forcibly ending the mobile game executed on the mobile operating system through the virtual terminal.

3. The method of claim 1, further comprising:
   transmitting user information to the mobile game service server when executing the mobile game; and
   receiving, by the monitoring module, the identification information corresponding to the user information from the mobile game service server,
   wherein the checking of the identification portion displayed on the display screen of the mobile game comprises:
   checking, by the monitoring module, whether the identification portion of the mobile game is displayed in a predetermined way based on the identification information;
   transmitting, by the monitoring module, check result whether the identification portion of the mobile game is displayed in the predetermined way to the mobile game service server; and
   receiving, by the monitoring module, user identification check from the mobile game service server.

4. The method of claim 1, wherein the emulator module, the monitoring module, and the mobile game macro are executed at the same level on the operating system module of the computer.

5. The method of claim 1, wherein the identification portion is a steganographic image encoded with a color code, and
   the steganography image comprises generation time information and user information.

6. The method of claim 5, wherein the executing of the mobile game on the mobile operating system comprises displaying the steganographic image on a display screen of the virtual terminal.

7. The method of claim 1, wherein the checking of the identification portion displayed on the display screen of the mobile game comprises:
obtaining, by the monitoring module, a decoding code received from the mobile game service server; and
decoding, by the monitoring module, the steganographic image based on the decoding code to detect the identification information.

8. The method of claim 7, wherein the executing of the mobile game on the mobile operating system comprises generating, by the mobile game, the identification portion based on a universally unique identifier (UUID) or a globally unique identifier (GUID) received from the mobile game service server.

9. The method of claim 8, wherein the checking of the identification portion displayed on the display screen of the mobile game further comprises periodically checking, by the monitoring module, whether the mobile game and the monitoring module are being executed on the same computer based on the identification portion displayed in the display screen of the mobile game.

10. The method of claim 1, further comprising
after executing the mobile game, checking whether the monitoring module is installed; and
when the monitoring module is not installed, forcibly ending, by the emulator module, the mobile game.

11. A method performed by a processor of a computer comprising:
executing a first emulator module and a second emulator module;
generating a first virtual terminal in the first emulator module and a second virtual terminal in the second emulator module;
executing a first mobile game through the first virtual terminal and a second mobile game through the second virtual terminal;
executing a monitoring module, configured to monitor use of a mobile game macro for the first and second mobile games executed in the first and second virtual terminals through the first and second emulator modules;
detecting, by the executed monitoring module, the use of the mobile game macro;
identifying a first user using a first identification portion displayed in the first mobile game and identifying a second user using a second identification portion displayed in the second mobile game, when the monitoring module detects the use of the mobile game macro; and
identifying and outputting, by the monitoring module, information of the first user or the second user.

12. A mobile game macro user monitoring device comprising:
a communicator configured to communicate with a mobile game service server;
a memory configured to store a mobile game, an emulator module configured to execute the mobile game in a compatible manner, and a monitoring module configured to monitor use of a mobile game macro for the mobile game; and
a processor configured to monitor a user using the mobile game macro for the mobile game executed through the emulator module using the monitoring module,
wherein the processor is configured to:
execute the emulator module,
generate a virtual terminal through the executed emulator module,
execute the mobile game through the generated virtual terminal,
execute the monitoring module,
control the executed monitoring module to detect use of the mobile game macro,
when the use of the mobile game macro is detected by the monitoring module, identify information associated with the user using an identification portion displayed on a display screen of the mobile game, and
control the communicator to transmit the identified information associated with the user or the identification portion to the mobile game service server.

13. The device of claim 12, wherein the processor is further configured to:
transmit the information associated with the user to the mobile game service server when executing the mobile game,
control the monitoring module to receive identification information corresponding to the information associated with the user from the mobile game service server,
control the monitoring module to check whether the identification portion of the mobile game is displayed in a predetermined way based on the identification information,
control the monitoring module to transmit check result whether the identification portion of the mobile game is displayed in the predetermined way to the mobile game server, and
control the monitoring module to receive user identification check from the mobile game server.

14. The device of claim 12, wherein the emulator module, the monitoring module, and the mobile game macro are executed at the same level on an operating system module.

15. The device of claim 12, wherein the identification portion is a steganographic image encoded with a color code, and
the steganography image comprises generation time information and user information.

16. The device of claim 15, wherein the processor is further configured to control to display the steganographic image on a display screen of the virtual terminal.

17. The device of claim 16, wherein the processor is further configured to control the monitoring module to obtain a decoding code received from the mobile game service server and decode the steganographic image based on the decoding code to detect the information associated with the user.

18. The device of claim 17, wherein the processor is further configured to control the mobile game to generate the identification portion based on a universally unique identifier (UUID) or a globally unique identifier (GUID) received from the mobile game service server.

19. The device of claim 18, wherein the processor is further configured to control the monitoring module to periodically check whether the mobile game and the monitoring module are being executed on a same personal computer based on the identification portion.

20. The device of claim 12, wherein the processor is further configured to check whether the monitoring module is installed, and control the emulator module to forcibly end the mobile game when the monitoring module is not installed.

* * * * *